(12) United States Patent
Matsuda (10) Patent No.: US 8,203,924 B2
(45) Date of Patent: Jun. 19, 2012

(54) OPTICAL INFORMATION RECORDING/REPRODUCING APPARATUS

(75) Inventor: Takahiro Matsuda, Yokohama (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 122 days.

(21) Appl. No.: 12/430,142

(22) Filed: Apr. 27, 2009

(65) Prior Publication Data

US 2009/0296557 A1 Dec. 3, 2009

(30) Foreign Application Priority Data

May 30, 2008 (JP) .................................. 2008-142029

(51) Int. Cl.
*G11B 7/00* (2006.01)
(52) U.S. Cl. .................. 369/103; 369/53.22; 369/53.23
(58) Field of Classification Search .................. 369/103, 369/53.22, 53.23
See application file for complete search history.

(56) References Cited

U.S. PATENT DOCUMENTS

| 2007/0242589 A1* | 10/2007 | Redmond et al. | 369/103 |
| 2009/0073850 A1* | 3/2009 | Ide et al. | 369/103 |
| 2009/0086607 A1* | 4/2009 | Fukushima | 369/103 |

FOREIGN PATENT DOCUMENTS

| JP | 07-272395 | 10/1995 |
| JP | 08-279243 | 10/1996 |
| JP | 2000-235753 | 8/2000 |

* cited by examiner

*Primary Examiner* — Adam R Giesy
(74) *Attorney, Agent, or Firm* — Antonelli, Terry, Stout & Kraus, LLP.

(57) ABSTRACT

There is provided an optical information recording/reproducing apparatus having an optical disc drive unit for driving an optical disc mounted, a hologram disc drive unit for driving a hologram disc mounted, a disc discrimination device for discriminating which of an optical disc and a hologram disc was mounted, a selection device of the disc drive unit for selecting an optical disc drive unit, when discriminated to be an optical disc, by the disc discrimination device, while selecting a hologram disc drive unit, when discriminated to be a hologram disc, by the disc discrimination device, and a drive device of the disc drive unit for driving the disc drive unit selected by the selection device of the disc drive unit.

8 Claims, 8 Drawing Sheets

OPTICAL INFORMATION RECORDING/REPRODUCING APPARATUS

INCORPORATION BY REFERENCE

The present application claims priority from Japanese application JP-2008-142029 filed on May 30, 2008, the content of which is hereby incorporated by reference into this application.

BACKGROUND OF THE INVENTION

The present invention relates to an optical information recording/reproducing apparatus for carrying out the information recording/reproducing to both of an optical disc represented by CD (compact Disc), DVD (Digital Versatile Disc), Blu-ray disc (hereafter referred to as "BD") etc., for carrying out the information recording/reproducing in rotation, and a hologram disc for carrying out the information recording/reproducing by utilization of holography.

Conventionally, as an apparatus for carrying out the information recording in an information recording area of the optical disc represented by CD, DVD, BD etc., or for carrying out the reproducing of information recorded in the information recording area, an optical disc apparatus has been used. In this optical disc apparatus, usually, the information recording/reproducing is carried out by rotation-driving the optical disc by an optical disc drive motor (for example, a DC motor etc.), and using an optical pickup to the information recording area of this rotation-driven optical disc.

As such an optical information recording/reproducing apparatus, for example, there has been introduced one provided with a shaft fixed at the base of an apparatus main body; a hub stand which is installed at one end of the shaft so as to be rotatable, and installed with a channel unit intermeshed with the inner rim part of the optical disc; a roller which contacts with the outer circumference of the optical disc mounted at the hub stand and rotation-drives the optical disc by the rotational movement; and a motor for rotation-driving the roller (for example, refer to JP-A-7-272395).

In addition, there has been introduced an optical information recording/reproducing apparatus provided with a head device for recording the information in the optical disc and/or reproducing information recorded in the optical disc; a rotation body which is formed at the vicinity of the head device so as to be rotatable and rotation-drives the optical disc in contact to a part of the above optical disc; and a driving device which rotation-drives the rotation body in nearly constant rotation velocity, so as to make possible rotation-driving both of the inner circumference and outer circumference of the optical disc, in predetermined linear velocity (for example, refer to JP-A-8-279243).

Further in addition, there has been introduced an optical information recording/reproducing apparatus provided with a disc clamp mechanism for sandwiching the outer rim part of the optical disc and clamping it in a free rotation state concentrically; and a motor for rotation-driving the optical disc clamped by the disc clamp mechanism, by action of alternating current magnetic field at the vicinity of the clamping position (for example, refer to JP-A-2000-235753).

SUMMARY OF THE INVENTION

In recent years, hologram recording technology for recording the digital information by utilization of holography has been noticed. Because this hologram recording technology is capable of simultaneously recording/reproducing the two-dimensional information by one hologram, as well as overwriting a plurality of page data in the same place, it is effective in recording and reproducing the high volume and high speed information. In the optical information recording/reproducing apparatus utilizing the hologram, it is desirable that recording or reproducing is possible in also the existing optical disc by the same apparatus, in view of compatibility to the upper ranking apparatus.

However, in the above JP-A-7-272395, JP-A-8-279243 and JP-A-2000-235753, there is no description on carrying out the information recording/reproducing in both of the hologram disc and the existing optical disc.

The present invention has been proposed under such circumstance, and it is an object of the present invention to provide an optical information recording/reproducing apparatus which is capable of recording the information in both of an information recording area of the holography disc, and an information recording area of the existing optical disc represented by BD, DVD, CD or the like, and/or reproducing the information recorded in the both information recording areas.

In order to attain this object, the present invention provides an optical information recording/reproducing apparatus for carrying out the recording of information in an information recording area of an optical information recording medium mounted and/or reproducing the information recorded in the information recording area, wherein the optical information recording medium is an optical disc for carrying out the recording and/or reproducing of information in rotation, and a hologram disc for carrying out the recording and/or reproducing of information, by utilization of holography; the optical information recording/reproducing apparatus having: an optical disc drive unit for driving the mounted optical disc; a hologram disc drive unit for driving the mounted hologram disc; a disc discrimination unit for discriminating whether the optical information recording medium mounted is the optical disc or the hologram disc; a selection device of the disc drive unit for selecting the optical disc drive unit when the optical information recording medium is discriminated to be the optical disc, and for selecting the hologram disc drive unit when the optical information recording medium is discriminated to be the hologram disc, by the disc discrimination unit; and a drive device of the disc drive unit for driving the drive unit selected by the selection device of the disc drive unit.

It should be noted that, in the present invention, the conventional optical disc, other than the hologram disc, is called simply as "an optical disc".

The optical information recording/reproducing apparatus relevant to the present invention is capable of recording the information in both of an information recording area of the holography disc, and an information recording area of the existing optical disc, and/or reproducing the information recorded in the both information recording areas.

Other objects, features and advantages of the invention will become apparent from the following description of the embodiments of the invention taken in conjunction with accompanying drawings.

DETAILED DESCRIPTION OF THE INVENTION

Explanation will be given next on the optical information recording/reproducing apparatus relevant to preferred embodiments of the present invention, with reference to drawings. It should be noted that, embodiments, which will be described below, are exemplifications for explaining the present invention, and thus the present invention should not be limited only to these embodiments. Therefore, the present invention can be carried out in various embodiments, as long as it does not depart from the gist thereof.

Figure 1:
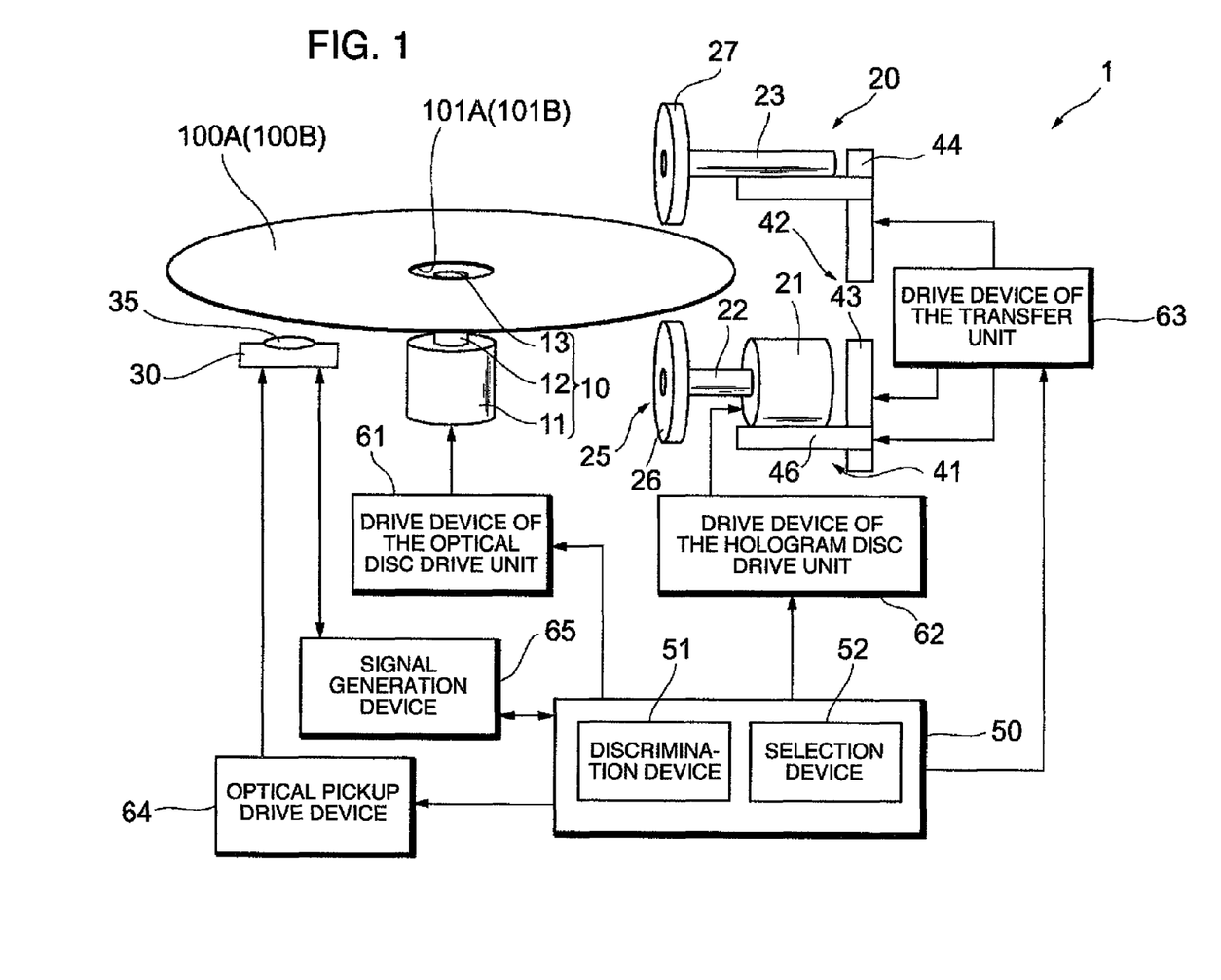
FIG. 1 is a configuration drawing showing an outline of external appearance and internal configuration of an optical information recording/reproducing apparatus relevant to the embodiment of the present invention, and a drawing showing a state that a hologram disc or an optical disc is mounted.
Figure 2:
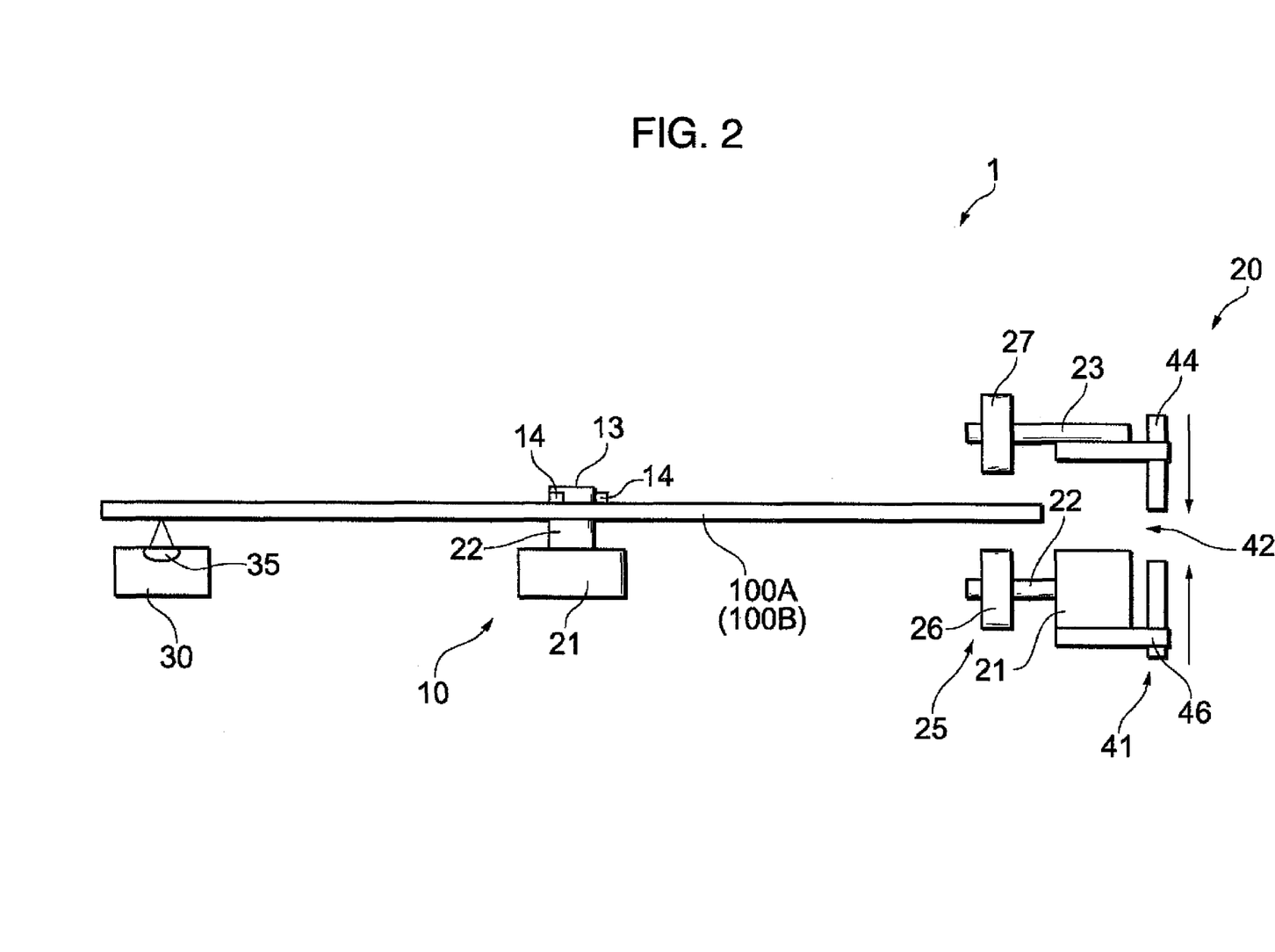
FIG. 2 is a side elevation view showing the outline of external appearance of the optical information recording/reproducing apparatus shown in FIG. 1.
Figure 3:
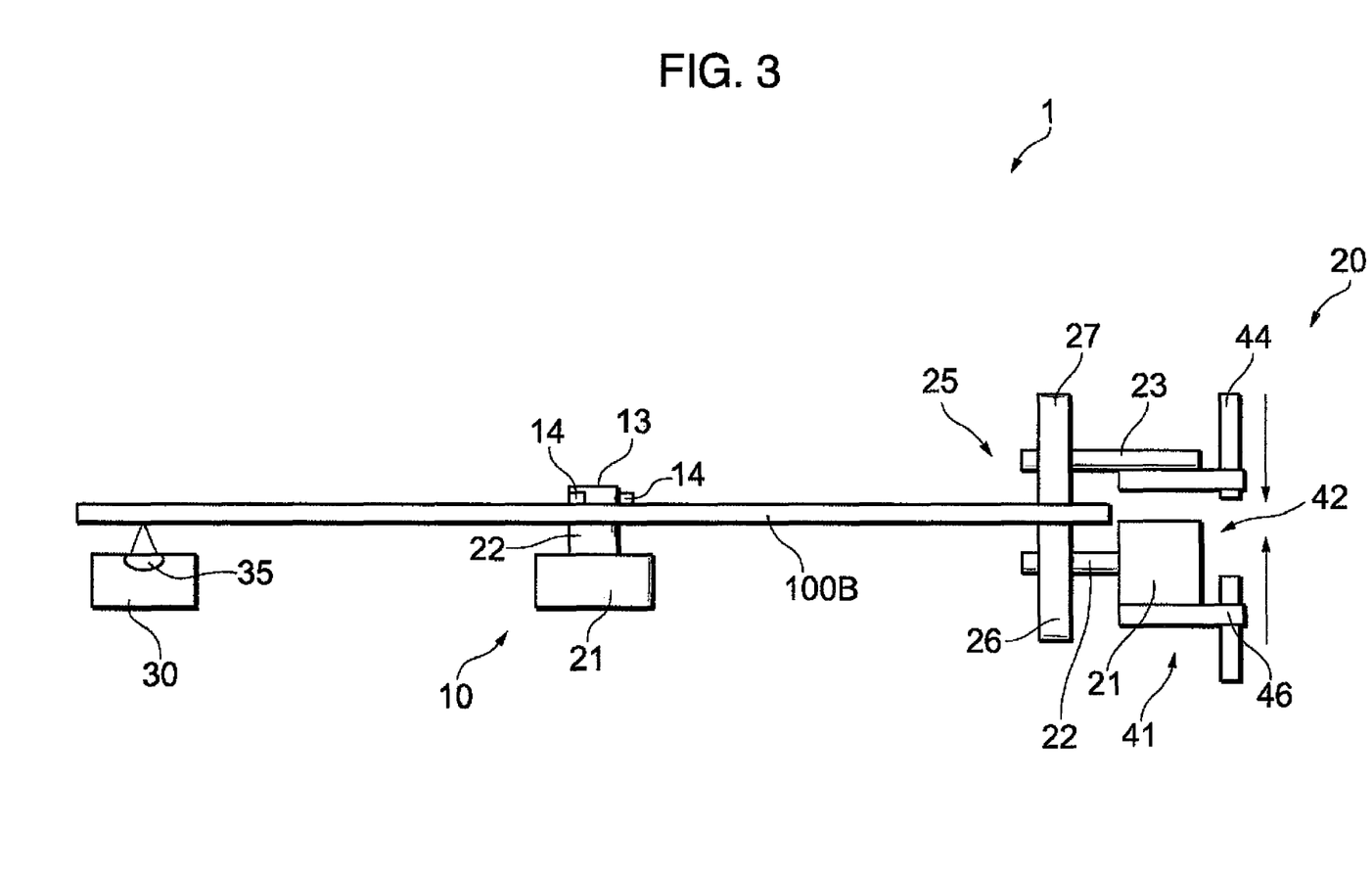
FIG. 3 is a side elevation view showing the outline of a state that a hologram disc is mounted at the optical information recording/reproducing apparatus shown in FIG. 2, and a rotation providing unit, which is a configuration element of the optical information recording/reproducing apparatus, is contacted with this hologram disc.
Figure 4:
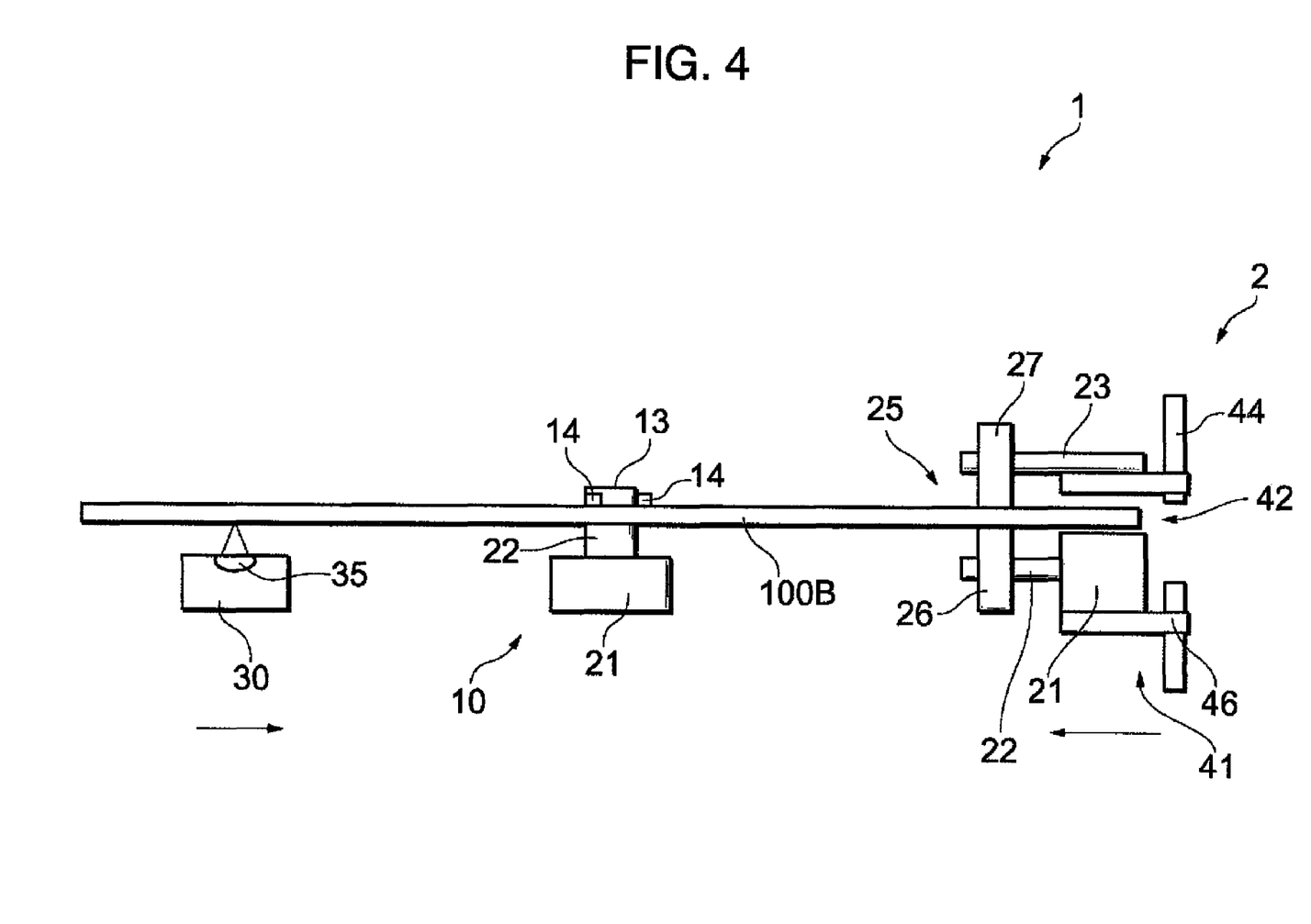
FIG. 4 is a side elevation view showing the outline of a state that an optical pickup and a hologram disc drive unit, which is a configuration element of the optical information recording/reproducing apparatus, are transferred from a state shown in FIG. 3 toward the center of the hologram disc.
Figure 5:
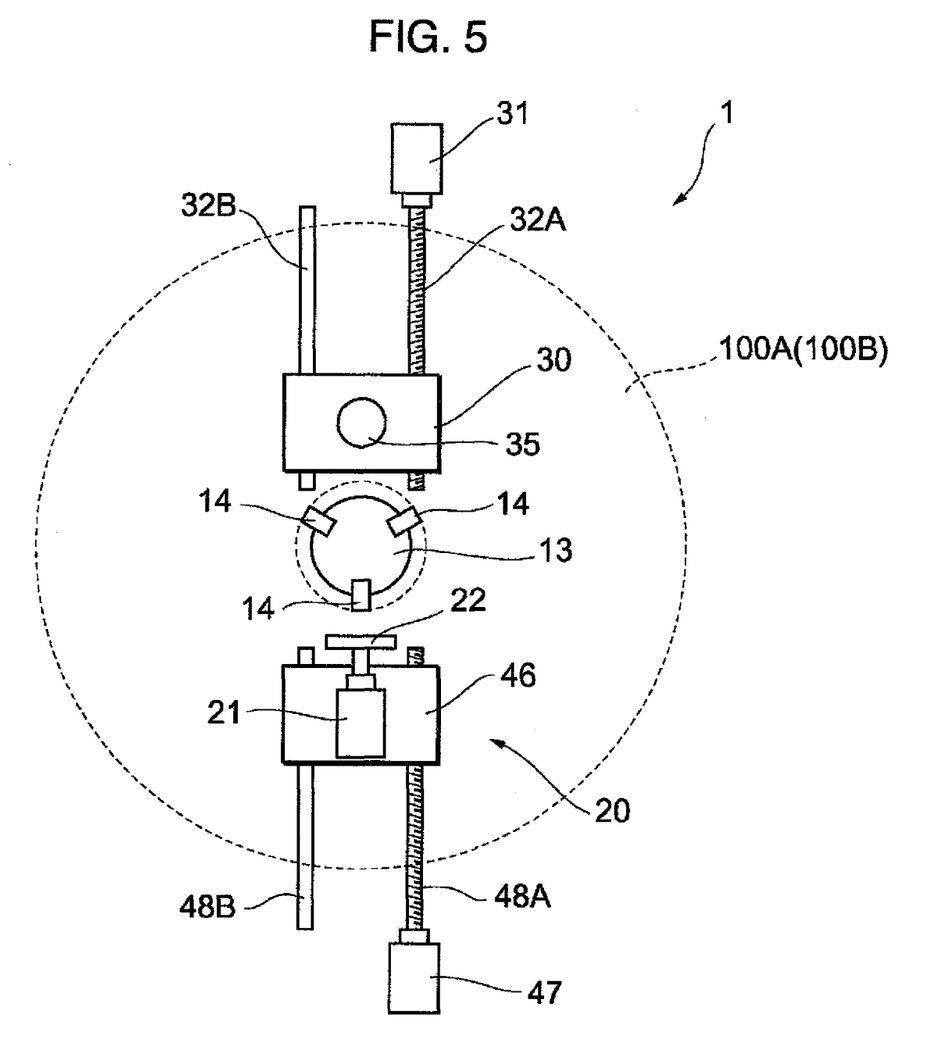
FIG. 5 is a plan view showing the outline of a configuration, where the optical pickup and the hologram disc drive unit shown in FIG. 4 are transferred to the hologram disc.

FIG. 1 is a configuration drawing showing an outline of external appearance and internal configuration of an optical information recording/reproducing apparatus relevant to the embodiment of the present invention, and a drawing showing a state that a hologram disc or an optical disc is mounted; FIG. 2 is a side elevation view showing the outline of external appearance of the optical information recording/reproducing apparatus shown in FIG. 1; FIG. 3 is a side elevation view showing the outline of a state that a hologram disc is mounted at the optical information recording/reproducing apparatus shown in FIG. 2, and a rotation providing unit, which is a configuration element of the optical information recording/reproducing apparatus, is contacted with this hologram disc; FIG. 4 is a side elevation view showing outline of a state that an optical pickup and a hologram disc drive unit, which is a configuration element of the optical information recording/reproducing apparatus, are transferred from a state shown in FIG. 3 toward the center of the hologram disc; and FIG. 5 is a plan view showing the outline of a configuration, where the optical pickup and the hologram disc drive unit shown in FIG. 4 are transferred to the hologram disc.

It should be noted that, in the present invention, when the hologram disc or the optical disc is mounted onto the optical information recording/reproducing apparatus, explanation will be given for a direction of position of the information recording area, as "down", and for the opposite side to this direction, as "up". In addition, in the above each drawing, to make explanation easier to understand, thickness or size of each member, extension and contraction ratio etc. are described without coincident with the real one. Further in addition, in the present embodiment, explanation will be given, by calling a medium represented by BD, DVD, CD etc. and to be used for information recording and/or reproducing in rotation as "an optical disc", and a medium to be used for information recording and/or reproducing by utilization of holography, as "a hologram disc".

As shown in FIG. 1 to FIG. 5, an optical information recording/reproducing apparatus 1 relevant to the present embodiment is provided with an optical disc drive unit 10 for driving an optical disc 100A mounted, a hologram disc drive unit 20 for driving a hologram disc 100B mounted, a first transfer unit 41 and a second transfer unit 42 for transferring the hologram disc drive unit 20, an optical pickup 30 for introducing laser light to each of the optical disc 100A and the hologram disc 100B, and a control device 50 for controlling these.

The optical disc drive unit 10 has, for example, an optical disc drive motor 11 for driving the optical disc 100A mounted, and a disk holding unit 13 arranged on a rotation axis 12 of the optical disc drive motor 11, and mounting each of the optical disc 100A and the hologram disc 100B so as to be capable of holding. And, this optical disc optical drive unit 10 is connected to the control device 50, and connected with a drive device of the optical disc drive unit 61 for driving the optical disc drive motor 11, corresponding to a signal received from the control device 50. It should be noted that, in the present embodiment, a DC brushless motor was used as the optical disc drive motor 11.

As shown in FIG. 2 to FIG. 5, the disc holding unit 13 is installed with an engaging claw 14 (in the present embodiment, three engaging claws are arranged in the same spacing) inserted into the center hole of the optical disc 100A and the center hole of the hologram disc 100B, and for engaging at a rim part, for defining each of the center holes of the optical disc 100A and the hologram disc 100B, in a detachable state. And, the optical disc 100A and the hologram disc 100B are surly chucked by the engaging claw 14, when mounted at the disc holding unit 13.

The hologram disc drive unit 20 has a hologram disc drive motor 21 for driving the hologram disc 100B mounted at the disc holding unit 13, and a rotation providing unit 25 arranged on a rotation axis 22 of a hologram disc drive motor 21 and contacted with the hologram disc 100B mounted at the disc holding unit 13, for rotating the hologram disc 100B. In addition, this hologram disc drive unit 20 is connected to the control device 50, and connected with the drive device of a hologram disc drive unit 62, for driving the hologram disc drive motor 21, corresponding to a signal received from the control device 50. It should be noted that, in the present embodiment, a stepping motor was used as the hologram disc drive motor 21.

The rotation providing unit 25 has a first roller 26 which is mounted at the tip of the rotation axis 22 and rotates by contacting with the surface (lower surface) where the optical pickup 30 injects laser light, and a second roller 27 which is jointed to the rotation axis 22 and mounted at the tip of a rotation axis 23 rotating in synchronization with rotation of the rotation axis 22 and rotates by contacting to the surface (upper surface) at the opposite side of the surface where the optical pickup 30 injects laser light. These first roller 26 and the second roller 27 are arranged at the facing positions by sandwiching the hologram disc 100B.

In addition, the hologram disc drive unit 20 is coupled to the first transfer unit 41 for transferring the hologram disc drive unit 20 in a diameter direction of the hologram disc 100B mounted at the disc holding unit 13. This first transfer unit 41 is one for transferring the hologram disc drive unit 20, so that the first roller 26 and the second roller 27 transfer in a diameter direction of the hologram disc 100B, in a region from the outer circumference of the center hole 101B of the hologram disc 100B to the outer circumference of the hologram disc 100B, and has a mounting stand 46 for mounting the hologram disc drive unit 20, and a motor 47 for transfer for transferring the mounting stand 46 in a diameter direction of the hologram disc 100B.

The mounting stand 46, for example, is capable of taking a configuration supported in a transferable state, on guide rails 48A and 48B (refer to FIG. 5) arranged on a chassis etc. not shown of the optical information recording/reproducing apparatus 1, so as to be in parallel to a diameter direction of the hologram disc 100B mounted at the disc holding unit 13. Here, the guide rail 48A may also act, for example, as the rotation axis of the motor 47 for transfer, and in this case, the mounting stand 46 may be transferred along the rotation axis (the guide rail 48A) and the guide rail 48B, by rotating the rotation axis (guide rail 48A), by screw cutting the rotation axis in advance, and forming an internal thread intermeshing with an external thread formed on the rotation axis on the mounting stand 46. It should be noted that in FIG. 5, description of the rotation axis 23 and the second roller 27 is omitted, however, the rotation axis 23 and the second roller 27 are transferred in a diameter direction of the hologram disc 100B, similarly as in the hologram disc drive motor 21 and the first roller 26. On the other hand, the motor 47 for transfer is connected with a drive device of the transfer unit 63, which is connected to the control device 50, and drives the motor 47 for transfer, corresponding to a signal received from the control device 50.

Further in addition, the hologram disc drive unit 20 is attached with the second transfer unit 42 for transferring the hologram disc drive unit 20 in up and down direction, so as to contact the first roller 26 and the second roller 27 to the lower surface and the upper surface of the hologram disc 100B mounted at the disc holding unit 13, respectively, and so as to evacuate each of the first roller 26 and the second roller 27 contacting to the lower surface and the upper surface, from these surfaces. The second transfer unit 42 has a first ascending and descending unit 43 for transferring the hologram disc drive motor 21 and the first roller 26 in the up and down direction to the lower surface of the hologram disc 100B, and a second ascending and descending unit 44 for transferring the rotation axis 23 and the second roller 27 in the up and down direction to the upper surface of the hologram disc 100B. In addition, the first ascending and descending unit 43 and the second ascending and descending unit 44 are connected with a drive device of the transfer unit 63, which is connected to the control device 50, for driving the first ascending and descending unit 43 and the second ascending and descending unit 44, corresponding to a signal received from the control device 50.

It should be noted that, in the initial state when a disc is not mounted at the disc holding unit 13, the hologram disc drive unit 20 is at position (hereafter referred to as "initial position") not to interfere the disc mounting operation to the disc holding unit 13, and waits at this initial position till the hologram disc 100B is mounted at the disc holding unit 13. In addition, in the present embodiment, the hologram disc drive unit 20 was arranged at position (that is on the same diameter) displaced by 180 degree in view of the rotation axis 22 as the center, to the optical pickup 30.

The optical pickup 30 is designed to be transferable along guide axes 32A and 32B (refer to FIG. 5) arranged at a chassis or the like (not shown) of the optical information recording/reproducing apparatus 1, so as to be in parallel to a diameter direction of the optical disc 100A and the hologram disc 100B mounted at the disc holding unit 13, and is one for recording the information commonly in the information recording area of the optical disc 100A and the information recording area of the hologram disc 100B, mounted at the disc holding unit 13, and for reproducing the information recorded. This optical pickup 30 transfers along the guide axis 32A and the guide axis 32B (refer to FIG. 5), by driving a motor 31 for transfer shown in FIG. 5. This motor 31 for transfer is connected with an optical pickup drive device 64, which is connected to the control device 50, for driving the motor 31 for transfer, corresponding to a signal received from the control device 50.

In the case where the optical pickup 30 carries out recording in the optical disc 100A, it emits (ejects) a signal beam to the information recording area of the optical disc 100A mounted at the disc holding unit 13 to record the information. An information signal to be recorded is transmitted to the optical pickup 30, via a signal generation device 65 connected to the control device 50, and the signal beam is focused as a light spot at the information recording area of the optical disc 100A, by an object lens 35 (a stop down lens) to record the information. In addition, in reproducing the information recorded in the optical disc 100A, it is attained by converting the reflected light from the optical disc 100A to an electric signal at the optical pickup 30, and by transmitting this electric signal to a signal processing circuit not shown connected to the control device 50.

On the other hand, in the case where the optical pickup 30 carries out recording in the hologram disc 100B mounted at the disc holding unit 13, reference beam and the signal beam are emitted to the information recording area of the hologram disc 100B, and digital information is recorded by utilization of holography. In this case, the information signal to be recorded is sent to a space photo modulator not shown inside the optical pickup 30 by the control device 50, via the signal generation device 65, and the signal beam is modulated by the space photo modulator. In the case of reproducing the information recorded in the hologram disc 100B, phase conjugated light (light wave proceeding in a reversed direction, while maintaining the same wave front as the incident light) of the reference beam emitted from the optical pickup 30, is generated by a phase conjugated light system not shown. Reproduced light to be reproduced by this phase conjugated light (traveling opposite direction and maintaining same wave front as the input light) is detected by a photo detector not shown inside the optical pickup 30, and the signal is reproduced by the signal processing circuit not shown connected to the control device 50.

In order to carry out the above recording and reproducing in one circle of the hologram disc, the hologram disc 100B is rotated by the rotation providing unit 25. In order to obtain light energy sufficient to record the information stably in the hologram disc 100B, it is desirable that the hologram disc 100B stands still, in carrying out the information recording and reproducing. Therefore, in the present embodiment, for this object, rotation of the rotation providing unit 25 is carried out by a stepping motor, so as to attain stable action of rotation-standing still of the hologram disc 100B.

As shown in FIG. 1, the control device 50 is connected to a driving device of the optical disc drive unit 61, a drive device of the hologram disc drive unit 62, the drive device of the transfer unit 63, an optical pickup driving device 64, the signal generation device 65 and an actuation device not shown required to actuate the optical information recording/reproducing apparatus 1, and controls these. This control device 50 is provided with a disc discrimination device 51 for discriminating whether the disc mounted at the disc holding unit 13 (the optical information recording medium) is the optical disc 100A or the hologram disc 100B, and a selection device of the disc drive unit 52 for selecting the optical disc drive motor 11 of the optical disc drive unit 10, when the disc mounted at the disc holding unit 13 (the optical information recording medium) is discriminated to be the optical disc 100A, and for selecting the hologram disc drive motor 21 of the hologram disc drive unit 20, when the optical information recording medium is discriminated to be the hologram disc 100B by the disc discrimination unit 51.

Figure 6:
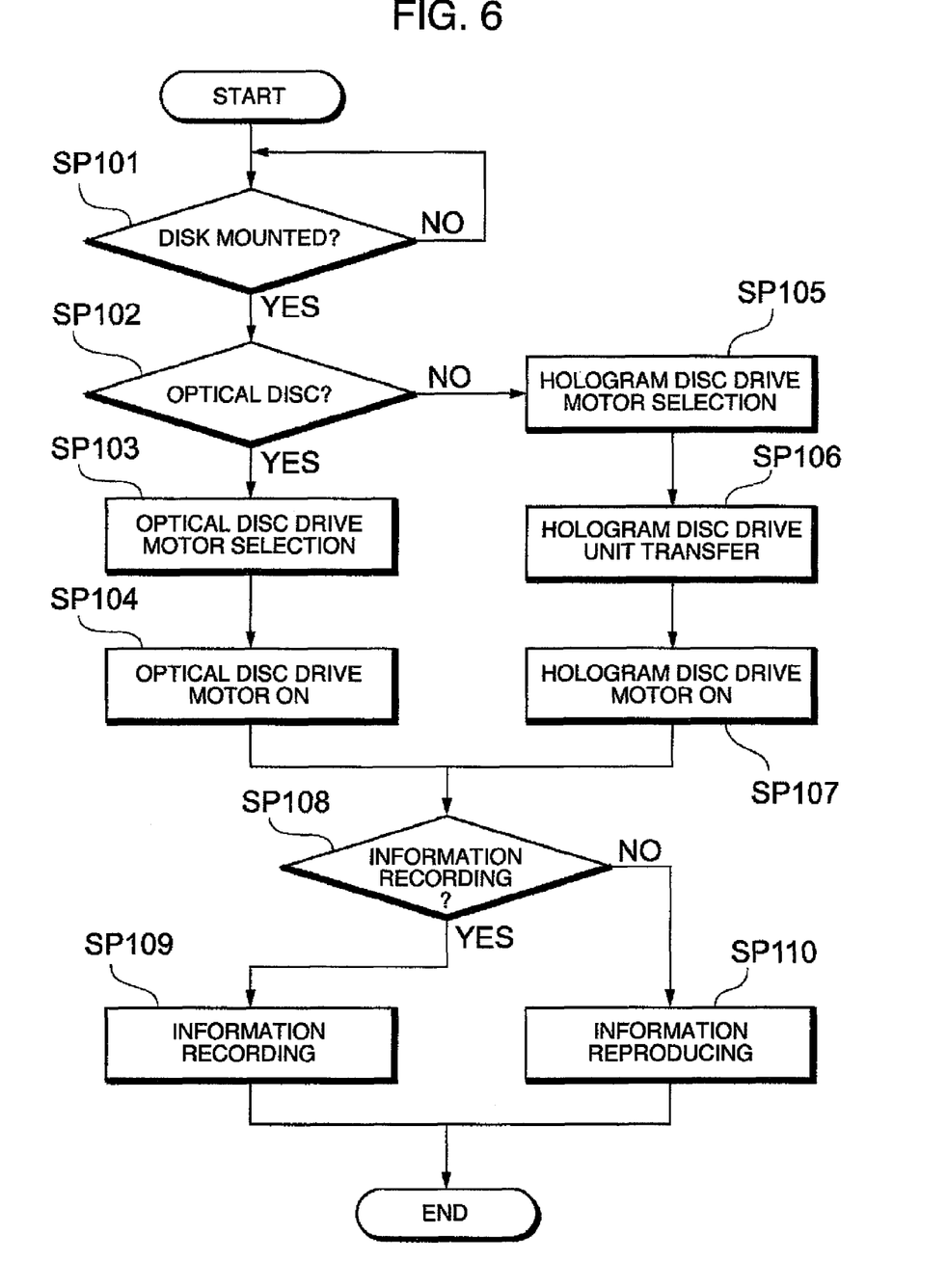
FIG. 6 is a flow chart showing the recording/reproducing processing relevant to the optical information recording/reproducing apparatus shown in FIG. 1.

Explanation will be given below on specific movement of the optical information recording/reproducing apparatus 1 relevant to the present embodiment, with reference to a drawing. FIG. 6 is a flow chart showing recording/reproducing processing relevant to the optical information recording/reproducing apparatus shown in FIG. 1.

First, in the step SP101, whether a disc is mounted or not at the disc holding unit 13 is discriminated by the control device 50. When a disc is inserted from a disc insertion entrance not shown of the optical information recording/reproducing apparatus 1, the rim part defining the center hole of this disc is chucked by the engaging claw 14 of the disc holding unit 13. By this operation, it is recognized by the control device 50 that the disc is mounted at the disc holding unit 13 (Step SP101: YES), and the process is forwarded to the step SP102. On the other hand, in the case where the disc is not mounted at the disc holding unit 13 (Step SP101: NO), the control device 50 waits till it recognizes that the disc was mounted at the disc holding unit 13. Alternatively, whether the disc is mounted or not may be discriminated by irradiation of laser light to the disc by the optical pickup 30 and by whether reflected light is present or not. In this case, kind of the disc may be discriminated at the same time by the reflected light.

Then, in the step SP102, whether a disc mounted at the disc holding unit 13 is the optical disc 100A or the hologram disc 100B, is discriminated by the disc discrimination device 51. In the case where the disc mounted at the disc holding unit 13 is the optical disc 100A (Step SP102: YES), by going forward to the step SP103, the optical disc drive motor 11 is selected by the selection device of the disc drive unit 52, then by going forward to the step SP104, the optical disc drive motor 11 is driven by the drive device of the optical disc drive unit 61. In this case, the first roller 26 and the second roller 27 wait at the initial position, and do not contact with the optical disc 100A. Therefore, they never give influence on rotation of the optical disc 100A. On the other hand, in the case where the disc mounted at the disc holding unit 13 is the hologram disc 100B (Step SP102: NO), the process is forwarded to the step SP105.

In the step SP105, the hologram disc drive motor 21 is selected by the selection device of the disc drive unit 52, and the process is forwarded to the step SP106. In this case, the motor 31 for transfer is driven by the optical pickup drive device 64, and the optical pickup 30 is transferred to information recording/reproducing position (for example, position with a distance from the center of r, on the radius of a circle passing the point X, shown in FIG. 7) to the hologram disc 100B. In addition, in the step SP106, the motor 47 for transfer of the first transfer unit 41 is driven by the drive device of the transfer unit 63, and the hologram disc drive unit 20 is transferred, so that the first roller 26 and the second roller 27 are positioned at the opposite side (on a diameter line passing the center O and the point X) sandwiching the center O, at position with a distance from the center of r, on the radius of a circle passing the point Y, shown in FIG. 7. Then, the first ascending and descending unit 43 is transferred till contacting with the lower surface of the hologram disc 100B, as well as the second ascending and descending unit 44 is transferred till contacting with the upper surface of the hologram disc 100B, by the drive device of the transfer unit 63 (refer to FIG. 3).

In this way, the hologram disc drive unit 20 is transferred by the motor 47 for transfer driven by the drive device of the transfer unit 63, corresponding to transfer of the optical pickup 30, so that distance (that is, positions of the first roller 26 and the second roller 27, based on the center O) from the center O to the first roller 26 and the second roller 27, and distance from the center O to light emission position (position of the light spot) of the optical pickup 30 become nearly the same.

Here, in the case of carrying out the recording of information in the information recording area of the hologram disc 100B, or in the case of carrying out the reproducing of information recorded in the information recording area, rotation control of the hologram disc 100B is carried out by carrying out the rotation control of the hologram disc drive motor 21 by the control device 50, via the drive device of the hologram disc drive unit 62. In this case, transfer distance of the light spot emitted from the optical pickup 30 on the hologram disc 100B, differs depending on position of the optical pickup 30. For example, as shown in FIG. 8, when the optical pickup 30 is present at the point $X_1$ (position with a distance from the center of $r_1$, on the radius of a circle passing the point $X_1$, shown in FIG. 8), the transfer distance $L_1$ of the light spot emitted from the optical pickup 30 is given as follows, in the case where the hologram disc 100B rotates by an angle of θ:

$$L_1 = 2\pi r_1 (\theta/360°)$$

Figure 8:
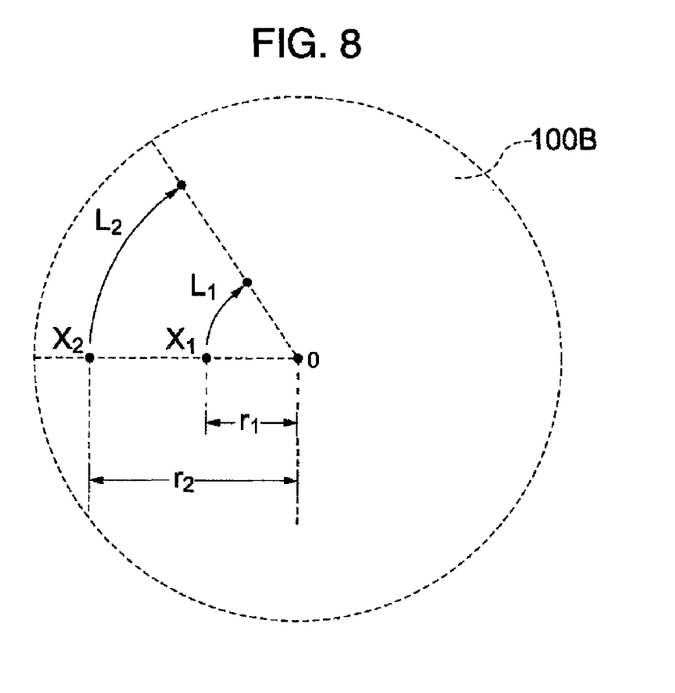
FIG. 8 is a plan view showing schematically the position of the optical pickup of the optical information recording/reproducing apparatus shown in FIG. 1 relative to the hologram disc.

In addition, as shown in FIG. 8, when the optical pickup 30 is present at the point $X_2$ (position with a distance from the center of $r_2$, on the radius of a circle passing the point $X_2$, shown in FIG. 8), the transfer distance $L_2$ of the light spot emitted from the optical pickup 30 is given as follows, in the case where the hologram disc 100B rotates by an angle of θ:

$$L_2 = 2\pi r_2 (\theta/360°)$$

Therefore, transfer distance of the light spot on the hologram disc 100B becomes $2\pi r_2(\theta/360°)$ times, for position difference of the optical pickup 30.

Figure 7:
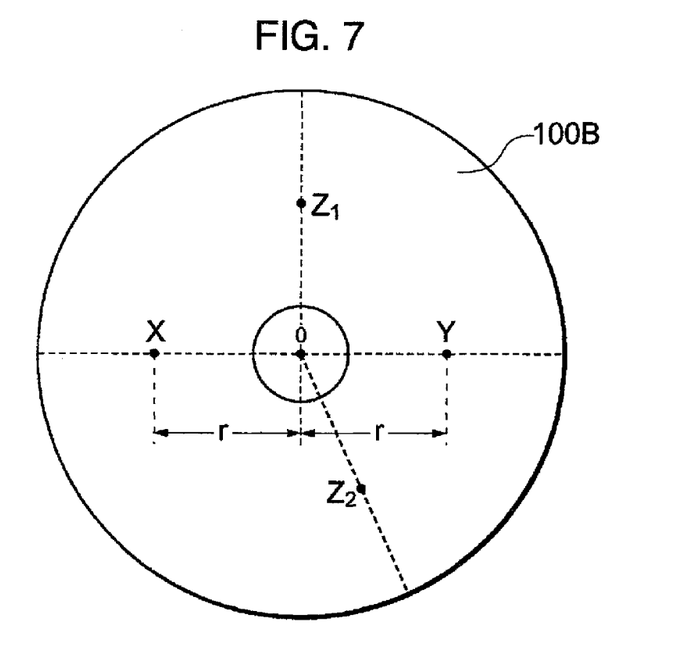
FIG. 7 is a plan view showing schematically the position of the optical pickup of the optical information recording/reproducing apparatus shown in FIG. 1, and a hologram disc drive unit, relative to the hologram disc.

Under the above circumstance, in the optical information recording/reproducing apparatus 1 relevant to the present embodiment, as described above, by transferring also positions of the first roller 26 and the second roller 27 corresponding to transfer of the optical pickup 30, distance from the center O to the light spot (position with a distance from the center of r on radius of a circle passing the point X, shown in FIG. 7), and distance from the center O to the first roller 26 and the second roller 27 (position with a distance from the center of r on radius of a circle passing the point Y, shown in FIG. 7) are made nearly the same. Therefore, for example, when the optical pickup 30 transfers in a direction coming closer to the center O, transfer of the first roller 26 and the second roller 27 in a direction coming closer to the center O, provides smaller rotation angle of the hologram disc 100B, to rotation of the hologram disc drive motor 21.

Specifically, for example, in the case where the first roller 26 and the second roller 27 are positioned at the point Y shown in FIG. 7, and radius of the first roller 26 and the second roller 27 is R, relation between rotation distance $L_3$ of the first roller 26 and the second roller 27 on the hologram disc 100B, and a rotation angle of θ of the hologram disc 100B is given as follows, when the first roller 26 and the second roller 27 rotate by a rotation angle of θ:

$$L_3 = 2\pi R(\theta/360°)$$

$$\theta = (L_3/2\pi r) \times 360° = \theta R/r$$

When the light spot is present at position with a distance of $r_1$ from the center O, transfer distance $L_1$ of the light spot on the hologram disc 100B, to a rotation angle of θ of the hologram disc 100B, is given as follows:

$$L_1 = 2\pi r_1(\theta/360°) = 2\pi r_1((\theta R/r)/360°)$$

In this way, in the case where position of the light spot transfers, by transfer of the first roller 26 and the second roller 27 corresponding to the transfer thereof, constant transfer distance $L_1$ can be obtained for the same step angle θ, irrespective of position of the light spot. Therefore, information recording/reproducing to the information recording area of the hologram disc 100B can be carried out in high precision.

Then, by going forward to the step SP107, and by going forward to the step SP104, and by driving the hologram disc drive motor 21 by the drive device of the hologram disc drive unit 62, the first roller 26 and the second roller 27 are driven. In this case, because the first roller 26 and the second roller 27 rotate with the lower surface and the upper surface of the hologram disc 100B, respectively, under contacting, the hologram disc 100B rotates by this rotation force. In addition, in this case, because the optical disc drive motor 11 is not driven (for example, in a non-energization state), it can be utilized as the rotation axis of the hologram disc 100B. In addition, by the fact that the hologram disc 100B is chucked surely by the engaging claw 14 of the disc holding unit 13, as well as sandwiched by the first roller 26 and the second roller 27, it can be hold in a more stable state. Therefore, deflection caused by warp or rotation of the hologram disc 100B can be suppressed surely, and operation for rotating the hologram disc 100B in arbitrary angle and fixing it can be carried out in high precision.

It should be noted that, when the hologram disc drive unit 20 transfers from a center position to other position accompanied with transfer of the optical pickup 30, the hologram disc drive unit 20 may be transferred by evacuating the first roller 26 and the second roller 27 to position apart from the surface of the hologram disc 100B, or may be transferred under rolling of the first roller 26 and the second roller 27 on the hologram disc 100B.

Then, by going forward to the step SP108, and in the case where information is recorded in the information recording area of the hologram disc 100B (Step SP108: YES), the process is forwarded to the step SP109, to carry out recording of information. On the other hand, in the case of reproducing the information recorded in the information recording area of the hologram disc 100B (Step SP108: NO), the process is forwarded to the step SP110, to carry out reproducing of information.

It should be noted that, explanation was given in the present embodiment, on the case where the hologram disc drive unit 20 was arranged on the same line sandwiching the center O to the optical pickup 30, however, it is not limited to this embodiment, and the hologram disc drive unit 20 may be arranged at arbitrary position such as, for example, at position shown by $Z_1$ in FIG. 7, or position shown by $Z_2$ in FIG. 7 etc., as long as it is position not to impair function of other parts, such as information recording/reproducing by the optical pickup 30. In addition, the hologram disc drive unit 20 may also be arranged on a common radius with the optical pickup 30. In this case, the hologram disc drive unit 20 can be transferred by the same motor 31 for transfer as that for the optical pickup 30. In addition, explanation was given in the present embodiment, on the case where the hologram disc drive unit 20 is transferred accompanying transfer of the optical pickup 30, however, it is not limited to this embodiment, and the hologram disc drive unit 20 may not necessarily be transferred accompanying transfer of the optical pickup 30.

In addition, explanation was given in the present embodiment, on the case where the optical pickup 30 and the hologram disc drive unit 20 are transferred, to the hologram disc 100B mounted at the disc holding unit 13, however, it is not limited to this embodiment, for example, in the case where the hologram disc drive unit 20 is arranged on the common radius with the optical pickup 30, the hologram disc 100B may be transferred to the optical pickup 30 and the hologram disc drive unit 20.

Further in addition, explanation was given in the present embodiment, on the case of transferring whole of the hologram disc drive unit 20, however, it is not limited to this embodiment, for example, length of the rotation axes 22 and 23 may be adjusted, by fixing the position of the hologram disc drive motor 21 in advance, and configuring the rotation axes 22 and 23 in a free extension and contraction state, and thus by extending and contracting the rotation axes 22 and 23 arbitrary, and thus position of the first roller 26 and the second roller 27 may be transferred.

Figure 9:
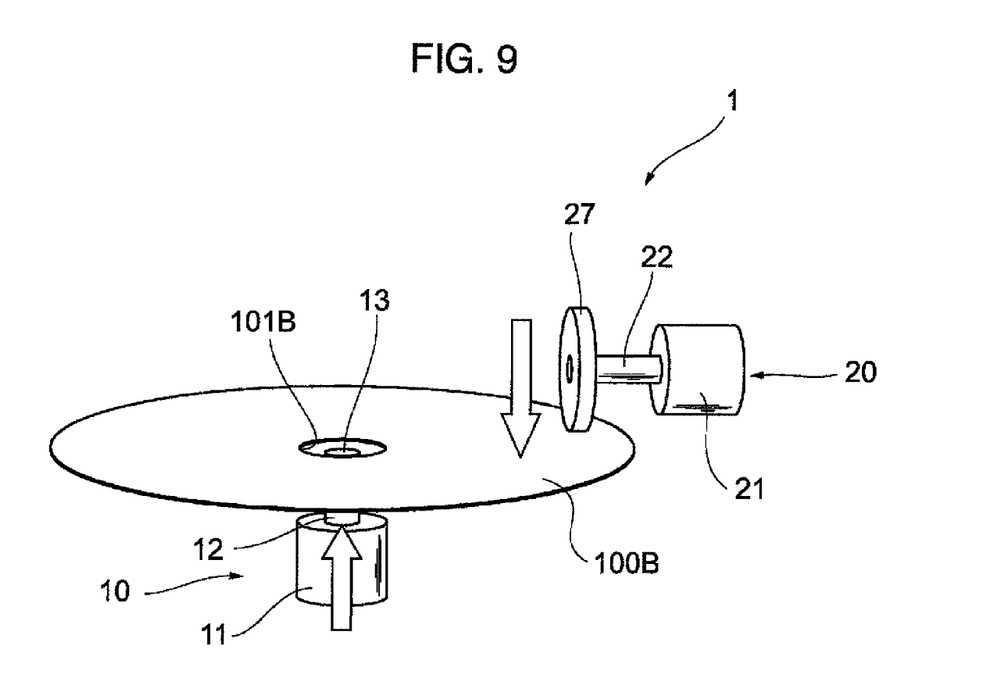
FIG. 9 is a perspective view showing the outline of external appearance of the optical information recording/reproducing apparatus relevant to other embodiment of the present invention.

Further in addition, explanation was given in the present embodiment, on the case of rotating the hologram disc 100B with sandwiching them by the first roller 26 and the second roller 27, however, it is not limited to this embodiment, for example, hologram disc 100B may be rotated by either one of the first roller 26 and the second roller 27, by adjusting contact pressure of the first roller 26 and the second roller 27 to the hologram disc 100B. It should be noted that, in the case of rotating the hologram disc 100B only by the second roller 27, as shown in FIG. 9, the second roller 27 may be arranged directly on the rotation axis 22 of the hologram disc drive motor 21. In addition, in the case of a configuration shown by FIG. 9, because the hologram disc 100B is supported from downward to upward by the disc holding unit 13, and pressed from upward to downward by the second roller 27, more stable rotation can be carried out. In this case, because any of the rollers does not contact with the surface where the optical pickup 30 injects laser light to the hologram disc 100B, information recording/reproducing can be carried out in high precision, over a further longer period of time.

Figure 10:
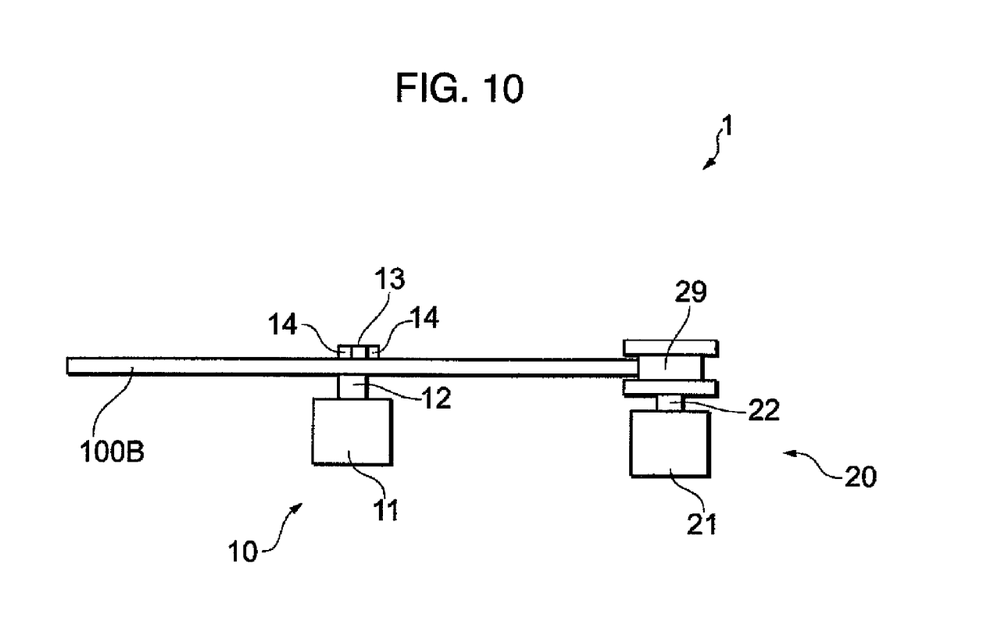
FIG. 10 is a side elevation view showing the outline of external appearance of the optical information recording/reproducing apparatus relevant to other embodiment of the present invention.

In addition, the optical information recording/reproducing apparatus relevant to the present invention may be configured, for example, as shown in FIG. 10, so that the hologram disc 100B is rotated by contacting a roller 29 mounted on the rotation axis 22 of the hologram disc drive motor 21, with the outer circumference of the hologram disc 100B. In the case of this configuration, because any of the rollers does not contact with the surface of the hologram disc 100B, where the optical pickup 30 injects laser light, information recording/reproducing can be carried out in high precision, over a further longer period of time.

Further in addition, explanation was given in the present embodiment, on the case where the optical disc 100A or the hologram disc 100B is chucked by the engaging claw 14 formed at the disc holding unit 13, however, it is not limited to this embodiment, for example, the optical disc 100A or the hologram disc 100B may be chucked, by configuring the disc holding unit 13 using a magnetized member, at the part to be inserted into the center hole 101A of the optical disc 100A or the center hole 101B of the hologram disc 100B, and after mounting the optical disc 100A or the hologram disc 100B, by covering the magnetized member with a metal cap from over the optical disc 100A or the hologram disc 100B.

In addition, explanation was given in the present embodiment, on the case where disc discrimination is carried out without rotating the disc mounted at the disc holding unit 13, however, it is not limited to this embodiment, and in the case where it is necessary to carry out the disc discrimination by reading information stored in the disc by rotating the disc, disc discrimination may be carried out by rotating the optical disc drive motor 11.

Further in addition, explanation was given in the present embodiment, on the case where a DC brushless motor was used as the optical disc drive motor 11, however, it is not limited to this embodiment, and the optical disc drive motor 11 is not especially limited, as long as it is a motor usually to be used in carrying out the information recording/reproducing, by rotating the optical disc 100A. In addition, explanation was given in the present embodiment, on the case where a stepping motor was used as the hologram disc drive motor 21, however, it is not limited to this embodiment, and the hologram disc drive motor 21 is not especially limited, as long as it is a motor usually to be used in carrying out the information recording/reproducing to the hologram disc 100B, for example, a servo motor etc.

Also in this embodiment, the optical pickup 30 is applicable to both the optical disc 100A and hologram disc 100B, however it is not limited to this structure. For example, it is available to have two optical pickups, that is an optical pickup 30A for information recording/reproducing on the optical disc 100A and an optical pickup 30B for information recording/reproducing on the optical disc 100B. In this case, one of the optical pickups is selected according to the kind of disc discriminated by the disc discrimination device 51 then recording or reproducing is executed.

The invention claimed is:

1. An optical information recording/reproducing apparatus for carrying out the recording of information in an information recording area of an optical information recording medium mounted and/or reproducing the information recorded in said information recording area,
    wherein said optical information recording medium is an optical disc for carrying out the recording and/or reproducing of information in rotation, and a hologram disc for carrying out the recording and/or reproducing of information, by utilization of holography;
    said optical information recording/reproducing apparatus comprising:
    an optical disc drive unit for driving said optical disc mounted;
    a hologram disc drive unit for driving said hologram disc mounted;
    a disc discrimination unit for discriminating said optical information recording medium mounted is one of said optical disc and said hologram disc;
    a selection device for selecting said optical disc drive unit when said optical information recording medium is discriminated to be said optical disc, and for selecting said hologram disc drive unit when said optical information recording medium is discriminated to be said hologram disc, by said disc discrimination unit; and
    a drive device for driving the selected one of said optical disc drive unit and said hologram disc drive unit selected by said selection device;
    wherein said optical disc drive unit comprises an optical disc drive motor, and a disc holding unit arranged on the rotation axis of said optical disc drive motor, and mounting each of said optical disc and said hologram disc, so as to be capable of holding;
    wherein said hologram disc drive unit comprises a hologram disc drive motor, and a rotation providing unit arranged on the rotation axis of said hologram disc drive motor, and contacted with the hologram disc mounted at said disc holding unit, so as to rotate said hologram disc; and
    wherein said rotation providing unit contacts said hologram disc at a region from the outer circumference of a center hole of said hologram disc to the outer circumference of said hologram disc which is mounted on said disc holding unit.

2. An optical information recording/reproducing apparatus for carrying out the recording of information in an information recording area of an optical information recording medium mounted and/or reproducing the information recorded in said information recording area,
    wherein said optical information recording medium is an optical disc for carrying out the recording and/or reproducing of information in rotation, and a hologram disc for carrying out the recording and/or reproducing of information, by utilization of holography;
    said optical information recording/reproducing apparatus comprising:
    an optical disc drive unit for driving said optical disc mounted;
    a hologram disc drive unit for driving said hologram disc mounted;
    a disc discrimination unit for discriminating said optical information recording medium mounted is one of said optical disc and said hologram disc;
    a selection device for selecting said optical disc drive unit when said optical information recording medium is discriminated to be said optical disc, and for selecting said hologram disc drive unit when said optical information recording medium is discriminated to be said hologram disc, by said disc discrimination unit; and
    a drive device for driving the selected one of said optical disc drive unit and said hologram disc drive unit selected by said selection device;
    wherein said optical disc drive unit comprises an optical disc drive motor, and a disc holding unit arranged on the rotation axis of said optical disc drive motor, and mounting each of said optical disc and said hologram disc, so as to be capable of holding;
    wherein said hologram disc drive unit comprises a hologram disc drive motor, and a rotation providing unit arranged on the rotation axis of said hologram disc drive motor, and contacted with the hologram disc mounted at said disc holding unit, so as to rotate said hologram disc; and
    wherein said rotation providing unit comprises a first roller for rotating said hologram disc, by contacting, and rotating, with the opposite side surface of the surface where laser light is injected, in recording and reproducing of the hologram disc mounted at said disc holding unit.

3. The optical information recording/reproducing apparatus according to claim 2, wherein said rotation providing unit further comprises a second roller for rotating said hologram disc, by contacting and rotating with the surface formed with the information recording area of the hologram disc, mounted at said disc holding unit, said second roller rotating said hologram disc, by sandwiching, together with said first roller.

4. An optical information recording/reproducing apparatus for carrying out the recording of information in an information recording area of an optical information recording medium mounted and/or reproducing the information recorded in said information recording area,
 wherein said optical information recording medium is an optical disc for carrying out the recording and/or reproducing of information in rotation, and a hologram disc for carrying out the recording and/or reproducing of information, by utilization of holography;
 said optical information recording/reproducing apparatus comprising:
 an optical disc drive unit for driving said optical disc mounted;
 a hologram disc drive unit for driving said hologram disc mounted;
 a disc discrimination unit for discriminating said optical information recording medium mounted is one of said optical disc and said hologram disc;
 a selection device for selecting said optical disc drive unit when said optical information recording medium is discriminated to be said optical disc, and for selecting said hologram disc drive unit when said optical information recording medium is discriminated to be said hologram disc, by said disc discrimination unit; and
 a drive device for driving the selected one of said optical disc drive unit and said hologram disc drive unit selected by said selection device;
 wherein said optical disc drive unit comprises an optical disc drive motor, and a disc holding unit arranged on the rotation axis of said optical disc drive motor, and mounting each of said optical disc and said hologram disc, so as to be capable of holding; and
 wherein said hologram disc drive unit comprises a hologram disc drive motor, and a rotation providing unit arranged on the rotation axis of said hologram disc drive motor, and contacted with the hologram disc mounted at said disc holding unit, so as to rotate said hologram disc; and
 further comprising a first transfer unit for transferring said rotation providing unit relatively to the hologram disc mounted at said disc holding unit and an optical pickup for carrying out the recording of information and/or reproducing information recorded in said both area in both of the information recording area of said hologram disc and the information recording area of the optical disc;
 wherein said first transfer unit transfers said rotation providing unit relatively from the outer circumference side toward the center of said hologram disc, when said optical pickup transferred relatively from the outer circumference side toward the center of said hologram disc; and
 transfers said rotation providing unit relatively from the center side toward the outer circumference of said hologram disc, when said optical pickup transferred relatively from the center side toward the outer circumference of said hologram disc.

5. The optical information recording/reproducing apparatus according to claim 4, wherein said first transfer unit transfers said rotation providing unit relatively to said hologram disc, corresponding to relative transfer of said optical pickup to said hologram disc, so that a distance of said rotation providing unit from the center of said hologram disc and a distance from the center of said hologram disc to light emission position of said optical pickup to said hologram disc become nearly the same.

6. The optical information recording/reproducing apparatus according to claim 4, wherein said first transfer unit transfers said rotation providing unit relatively to said hologram disc, together with said hologram disc driving motor.

7. An optical information recording/reproducing apparatus for carrying out the recording of information in an information recording area of an optical information recording medium mounted and/or reproducing the information recorded in said information recording area
 wherein said optical information recording medium is an optical disc for carrying out the recording and/or reproducing of information in rotation, and a hologram disc for carrying out the recording and/or reproducing of information, by utilization of holography;
 said optical information recording/reproducing apparatus comprising:
 an optical disc drive unit for driving said optical disc mounted;
 a hologram disc drive unit for driving said hologram disc mounted;
 a disc discrimination unit for discriminating said optical information recording medium mounted is one of said optical disc and said hologram disc;
 a selection device for selecting said optical disc drive unit when said optical information recording medium is discriminated to be said optical disc, and for selecting said hologram disc drive unit when said optical information recording medium is discriminated to be said hologram disc, by said disc discrimination unit; and
 a drive device for driving the selected one of said optical disc drive unit and said hologram disc drive unit selected by said selection device;
 wherein said optical disc drive unit comprises an optical disc drive motor, and a disc holding unit arranged on the rotation axis of said optical disc drive motor, and mounting each of said optical disc and said hologram disc, so as to be capable of holding;
 wherein said hologram disc drive unit comprises a hologram disc drive motor, and a rotation providing unit arranged on the rotation axis of said hologram disc drive motor, and contacted with the hologram disc mounted at said disc holding unit, so as to rotate said hologram disc; and
 wherein said rotation providing unit contacts with the outer circumference of the hologram disc held at said disc holding unit.

8. An optical information recording/reproducing apparatus for carrying out the recording of information in an information recording area of an optical information recording medium mounted and/or reproducing the information recorded in said information recording area,
 wherein said optical information recording medium is an optical disc for carrying out the recording and/or reproducing of information in rotation, and a hologram disc for carrying out the recording and/or reproducing of information, by utilization of holography;
 said optical information recording/reproducing apparatus comprising:
 an optical disc drive unit for driving said optical disc mounted;
 a hologram disc drive unit for driving said hologram disc mounted;

a disc discrimination unit for discriminating said optical information recording medium mounted is one of said optical disc and said hologram disc;

a selection device for selecting said optical disc drive unit when said optical information recording medium is discriminated to be said optical disc, and for selecting said hologram disc drive unit when said optical information recording medium is discriminated to be said hologram disc, by said disc discrimination unit; and a drive device for driving the selected one of said optical disc drive unit and said hologram disc drive unit selected by said selection device;

wherein said optical disc drive unit comprises an optical disc drive motor, and a disc holding unit arranged on the rotation axis of said optical disc drive motor, and mounting each of said optical disc and said hologram disc, so as to be capable of holding; and wherein said hologram disc drive unit comprises a hologram disc drive motor, and a rotation providing unit arranged on the rotation axis of said hologram disc drive motor, and contacted with the hologram disc mounted at said disc holding unit, so as to rotate said hologram disc;

further comprising a second transfer unit for contacting said rotation providing unit to said hologram disc in the case of carrying out the recording of information in the information recording area of said hologram disc and/or reproducing information recorded in said information recording area, and for evacuating said rotation providing unit to a position not in contact with said hologram disc in the case of not carrying out the recording of information in the information recording area of said hologram disc and/or not reproducing information recorded in said information recording area.

* * * * *